US006760707B2

(12) United States Patent
Provost

(10) Patent No.: US 6,760,707 B2
(45) Date of Patent: Jul. 6, 2004

(54) METHOD FOR ADVERTISING REAL ESTATE OVER THE INTERNET

(76) Inventor: Amanda Provost, 1128 Mission St., South Pasadena, CA (US) 91030

( * ) Notice: Subject to any disclaimer, the term of this patent is extended or adjusted under 35 U.S.C. 154(b) by 275 days.

(21) Appl. No.: 09/872,446

(22) Filed: Jun. 1, 2001

(65) Prior Publication Data

US 2002/0184117 A1 Dec. 5, 2002

(51) Int. Cl.$^7$ ............................................. G06F 17/60
(52) U.S. Cl. .............................. 705/26; 705/27; 705/1; 713/201
(58) Field of Search ............................. 705/26, 27, 1; 713/201

(56) References Cited

U.S. PATENT DOCUMENTS

| | | |
|---|---|---|
| 5,032,989 A | 7/1991 | Tornetta |
| 5,414,621 A | 5/1995 | Hough |
| 5,584,025 A | 12/1996 | Keithley |
| 5,664,115 A | 9/1997 | Fraser |
| 5,736,977 A | 4/1998 | Hughes |
| 5,754,850 A | 5/1998 | Janssen |
| 5,794,216 A | 8/1998 | Brown |
| 5,940,807 A | 8/1999 | Purcell |
| 5,945,989 A | 8/1999 | Freishtat |
| 6,014,638 A | 1/2000 | Burge |
| 6,035,294 A | 3/2000 | Fish |
| 6,038,668 A | 3/2000 | Chipman |

FOREIGN PATENT DOCUMENTS

JP         2002373198 A   * 12/2002   ........... G06F/17/60

OTHER PUBLICATIONS www.schubb.com, http://schubb.com/youraddress_com-.htm, Mar. 6, 2001.*
www.ushx.com, http://web.archive.org/web/*/http://www.ushx.com, Mar. 1, 2000.*
http://www.realsites.com. http://web.archive.org/web/*/www.realsites.com, Feb. 8, 2000.*
USHX.com, http://web.archive.org/web/*/http://www.ushx.com/, Jan. 25, 1999, discloses a system for buying and seller real estate over the Internet.*
Web site http://www.realtor.com/imarketing.
Web site http://www.ushx.com.
Web site http://www.listingmanager.com/manager.

* cited by examiner

*Primary Examiner*—Jeffrey A. Smith
*Assistant Examiner*—Matthew Gart

(57) ABSTRACT

An Internet-based method and system permits users to list their real estate properties on a respective web site, edit their site, and create new web sites for additional listings. A feature of the invention provides for registering a domain name file for each new page and for E-mailing a request to register the new domain names. Such web site creation and editing may be made whenever the user wishes by simply accessing a home page, entering a corresponding service function such as editing an existing web site or creating a new web site. The user can then carry out the selected function from a personal computer over the Internet. The domain name may correspond to a parameter of the property such as its street address.

4 Claims, 2 Drawing Sheets

METHOD FOR ADVERTISING REAL ESTATE OVER THE INTERNET

BACKGROUND OF THE INVENTION

The present invention generally relates to advertising and selling of real estate and, more specifically, to online advertising and selling of real estate by enabling sellers to create individualized web sites for individual properties for sale.

The proliferation of personal computers having access to the Internet has significantly altered the way sellers and buyers can find each other to effect a mutually beneficial transaction. The buyer has the benefit of numerous search engines that can find web sites based upon selected words or phrases. The seller has the benefit of using one or more web sites with numerous pages and links to describe products, receive buyer information and selections, and effect the purchase.

One particular area of commerce that gains significantly from the technical innovations of the Internet is the real estate market. Buyers employ the Internet to search for available properties in particular neighborhoods, having certain features they desire, being offered within selected ranges of price, and so forth. Sellers, through their brokers, can offer their properties at a web site which can be used to present relevant data such as price, number of rooms, size, age, construction and to provide photographs of the properties. Such web sites are particularly useful when the product data remains relatively stable over time because changing the content of each page of a web site on a frequent basis such as every week or even every day, can be relatively inconvenient and costly.

Unfortunately, real estate offerings inherently undergo a rapid rate of change. Properties are sold or enter escrow and are taken off the market. New properties regularly become available. Prices of available properties change often to attract more potential buyers. Terms change such as whether a seller may be willing to carry a second mortgage and at what interest rate or the amount of earnest money required to hold a property during the escrow period. In any event, it is evident that the way real estate property is advertised and sold is not amenable to an Internet system in which relatively fixed web site presentations are inconvenient and costly to change or create on a frequent basis.

Various prior art patents provide real estate-related system and methods that are computer and/or Internet oriented. Of particular interest in this regard are the following references and examples:

U.S. Pat. No. 5,794,216, Aug. 11, 1998, for Method And System For Data Acquisition In A Multimedia Real Estate Data Base, is a system for data acquisition in a multimedia real estate database. The database contains textual information for each house for sale, an exterior image for each house, an interior image for each house, and a parameter indicating a portion of the exterior image corresponding to the interior image. All of the foregoing is in a common database format.

U.S. Pat. No. 5,754,850, May 19, 1998, for Real-Estate Method And Apparatus For Searching For Homes In A Search Pool For Exact And Close Matches According To Primary And Non-Primary Selection Criteria, is a real estate method for searching for homes in a search pool according to selection criteria. Selection features are selected and each item in the database is examined to determine if an item has a given search feature. If an item is an exact match to a given search feature, then that item is assigned full points. If an item closely matches the search feature, then the item is assigned partial points. Items with the highest total points are displayed.

U.S. Pat. No. 5,584,025, Dec. 10, 1996, Apparatus And Method For Interactive Communication For Tracking And Viewing Data, is a system for acquiring and displaying information relating to a specific industry such as real estate. The information relates to a particular property, community, financing, demographics, et cetera and can be accessed by real estate agents and end users. When, where, and how often an advertisement and/or property is viewed is instantly recorded by the system. Viewership and response patterns can be retrieved by advertisers.

However, none of these prior art disclosures provides a system or method that is real estate oriented and which addresses the aforementioned problem of rapidly changing data including the need to frequently delete sold properties and add newly available properties.

SUMMARY OF THE INVENTION

In one aspect of the present invention, a method of advertising products and services through at least one web site on the Internet, such products and services having frequently changing parameters rendering it desirable for a seller to also frequently modify the web site to keep the advertising current; comprises a) providing a home web site; b) determining at the home web site whether a user is an existing customer or a new customer and linking to either of at least two alternative second web sites depending upon the determination; c) if the user is an existing customer, presenting user log-in data entry at the corresponding second web site; d) verifying that the log-in data is valid; e) offering the verified user a selection from a plurality of service functions, at least one of the functions being the creation of a new page for advertising an added product or service; f) linking the user who has selected the creation service function to a site creation page and permitting the user to select a new site layout and to enter data related to the added product or service; g) providing payment data entry to the user and verifying the payment data; and h) linking the user to a final page for finalizing the new site creation, updating appropriate database entries, and obtaining a file folder corresponding to a domain name for the new site.

In another aspect of the present invention, a system for advertising real estate on the Internet and permitting a user to add new linked web sites corresponding to additional real estate properties offered by the user comprises a plurality of computers each having an Internet browser and being connected for communication through an ISP to the Internet; at least one web server having a corresponding data base and being connected to the Internet, with the web server and corresponding data base having account and web site data for a plurality of users, each such user being assigned at least one web site page pertaining to at least one real estate property; and the server having a device for receiving data corresponding to a new real estate property listing, generating a corresponding new web site page, and creating a file having a corresponding domain name.

These and other features, aspects and advantages of the present invention will become better understood with reference to the following drawings, description and claims.

DETAILED DESCRIPTION OF THE INVENTION

It will be understood hereinafter that while the present invention is particularly useful and advantageous in the advertising and sale of real estate properties over the Internet, the invention is applicable to a variety of commercial transactions where descriptions and other data relating to the offered commodities change frequently.

In general, the present invention provides a simple, but unique and elegant solution to Internet-based advertising and sale of rapidly changing commodities including real estate properties. In contrast to past methods and systems, the present invention enables a user such as a seller of real estate property to create a Listing Domain such as 555MainStreet.com. The Listing Domain is a seller-created web site that permits frequent updating of such information, and allows a prospective buyer to view the information over the Internet, either through a central portal or separately from such portal. An embodiment of the system and method herein also provides for account creation, log-in functions, and user administration functions. In yet another aspect of the present invention, users can create or modify web site layout and information at any time they wish over the Internet, pay for such services such as by providing credit card information, and subsequently receive verification of such services such as by E-mail sent to the user over the Internet.

Figure 1:
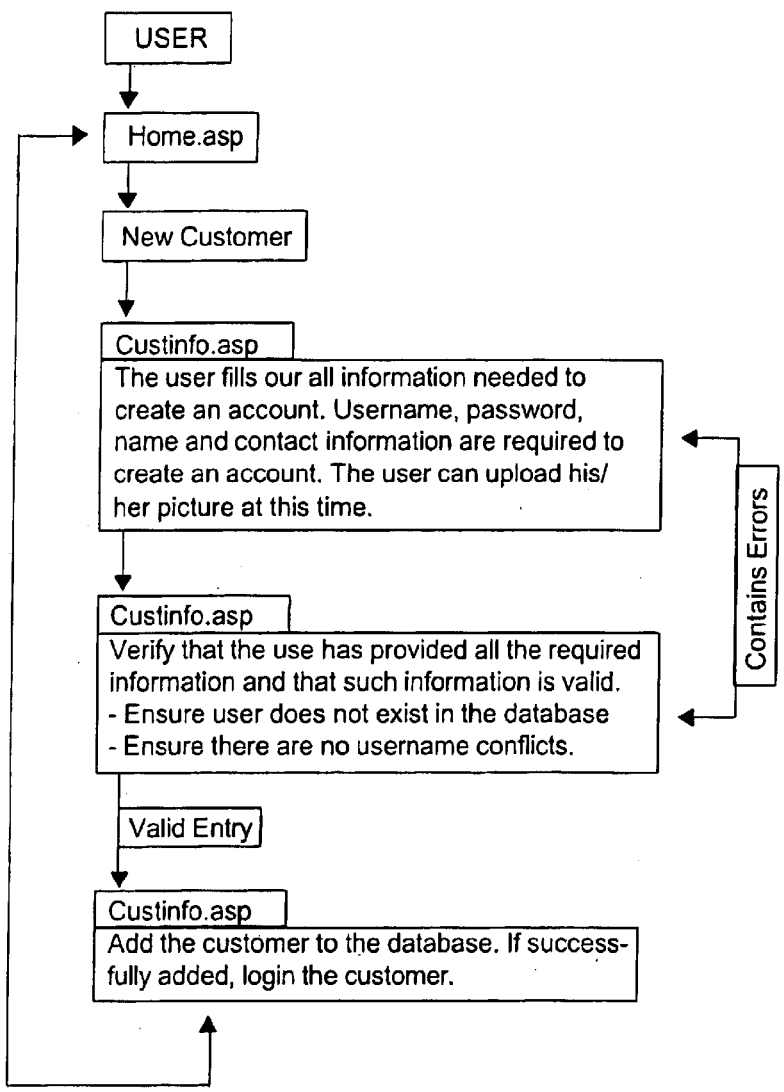
FIG. 1 is a flow chart diagram of the method of the invention for use by existing customers.

Referring to the drawings and particularly to FIG. 1, there is shown a flow diagram that contains the steps of an embodiment of the inventive method. The steps shown in FIG. 1 are those that may be carried out by an existing customer or user having access to the invention by means of an Internet connection. It will be understood that such a connection typically involves a personal computer that has been programmed to provide an Internet browser and that has a communication interface such as a phone or DSL modem that is connected to a suitable telephone system. Further, it will be understood that the customer or user has access through an Internet Service Provider (ISP) to the Internet and its World Wide Web to display and interact with any web site having a registered Domain Name including a suitable Uniform Resource Locator (URL). In view of the well-known characteristics and operation of such apparatus and software, they need not be described herein in detail. Moreover, other and more recent innovations for Internet access, such as wireless access through PDA's and cell phones, are also contemplated for use by customers and users of the present invention.

It will be seen in FIG. 1 that a user begins the process by entering an Active Server Page (ASP) called "home.asp". An ASP is a dynamic HyperText Markup Language (HTML) device that combines HTML and Visual Basic (VB) script and generates HTML on a web server. If the user indicates that the user is an existing customer, the user then attempts to log-in by entering a username and password at the site "login.asp". If the username/password combination is valid as determined at the site "verifyuser.asp" (i.e., already in the server database), the user is then permitted to select at the site "selectaction.asp" a service function to perform, such as to create a site, perform administrative work (i.e., changes to existing web sites or Listing Domains), et cetera.

In the illustrated embodiment, if the user selects the site "administer.asp", the user is then able to add and/or edit property information at "createsite.asp" for existing property sites or Listing Domains such as modifying price status or edit customer information at "custinfo.asp". The user may also view, post and remove material such as reports regarding site visitors and the like. Upon completion of these administrative functions, the system may return to "home.asp" where the user may start the process anew.

Alternatively, if the user wishes to create a new site or Listing Domain, the user may go to "chooselook.asp" to look at an existing site and then to "createsite.asp" to select a new site layout and provide other information regarding the newly presented property. The system is designed to sense errors and determine when an entry is valid.

The user then proceeds to the site "pay.asp" where credit card payment for the new site may be effected as well as providing additional verification of the user's identity. If the credit card transaction is successful, the user gains access to the site "finalizeorder.asp" where the user may finalize or complete the new site or Listing Domain order.

The "finalizeorder.asp" site automatically serves a number of functions. In the illustrated embodiment, these functions include adding a property.com folder for a domain name corresponding to the newly created site for the newly displayed property. Thus, for example, a new Listing Domain such as 555MainStreet.com is created by the inventive system to correspond to the new order for a property having the street address 555 Main Street. The server database is updated to reflect the new site and the entered information. The user is sent an E-mail acknowledgement of the new site order. E-mail is also sent to the HostPro to set up the domain association for 555MainStreet.com. Finally, the method provider, in this instance Properties Online, is notified of the new transaction by E-mail as well. The system then returns to "home.asp" in the event that the user wishes to amend or create another property site.

Figure 2:
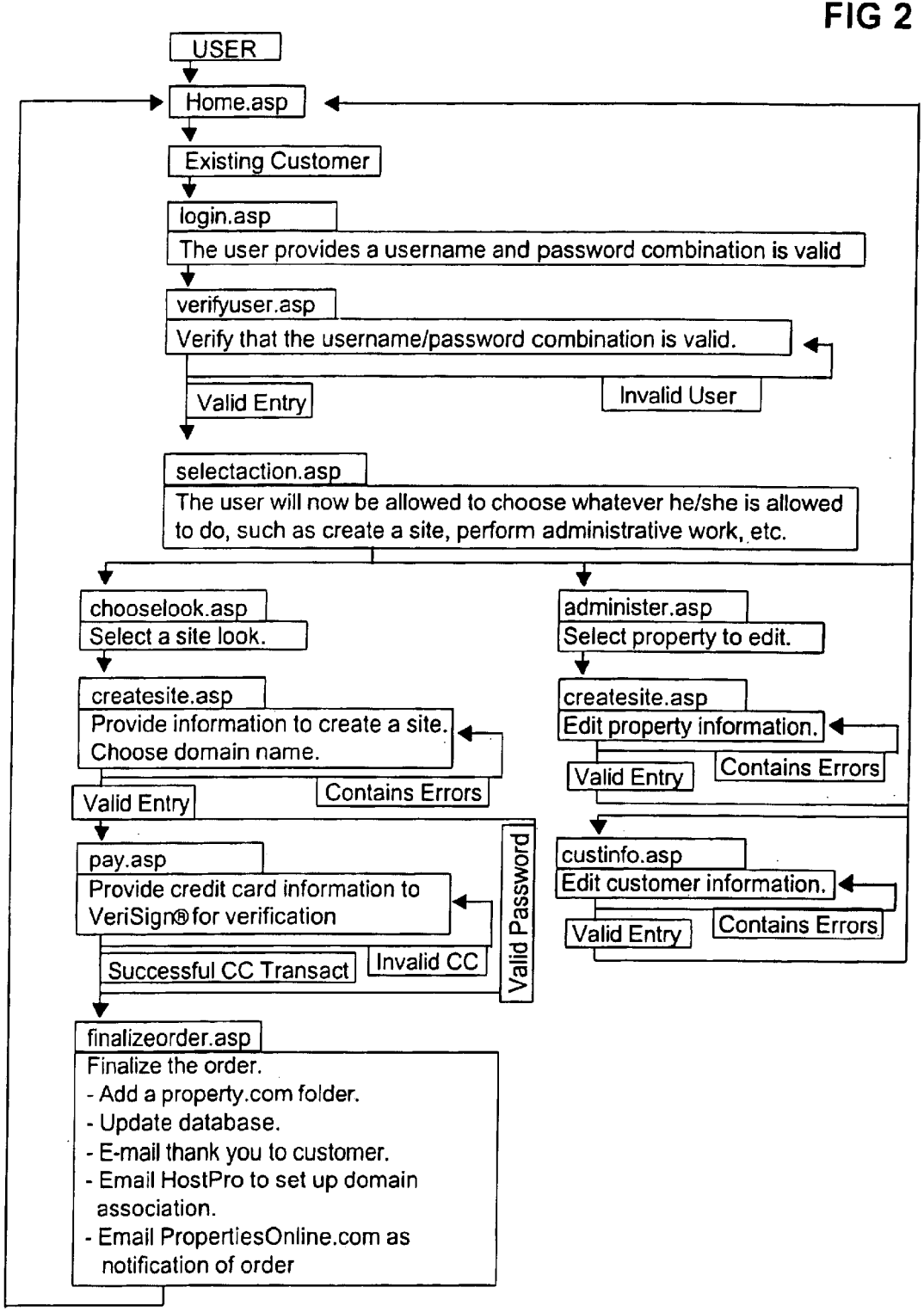
FIG. 2 is a flow chart diagram of the method of the invention for use by new customers.

FIG. 2 illustrates a flow diagram that contains other steps of another embodiment of the inventive method. The steps shown in FIG. 2 are those that may be carried out by a new customer or user. More specifically, as shown in FIG. 2, upon entry to the web site "home.asp", the user indicates that he or she is a new customer and is sent to the site "custinfo.asp". At this site, the new customer fills out all needed information to create an account including at least a username and password. Other information, such as the name and address of the user's agent, may also be provided for convenience and/or security.

The system of the present invention then verifies the provided information. Such verification may include the steps of ensuring that the customer does not already exist in the server database and of ensuring that there are no username conflicts. The new customer is then added to the database if there are errors needing correction. The system then returns to the site "home.asp".

In application, a seller of real estate may create a Listing Domain that contains pictorial and textual information about a property for sale or rent, as an example. Selling terms and/or property features, as an example, described in the Listing Domain can be continually accessed, added, deleted, and changed by the seller. Likewise, the Listing Domain can be accessed by potential buyers, as an example, either indirectly through the "home.asp" site (i.e, central portal) or directly to the URL of the Listing Domain. Consequently, and unlike prior systems and methods, the present invention enables buyers to locate real estate, as an example, without having to first locate the "home.asp" site. In other words, the Listing Domain may be advertised on a posted sign on the property for sale, as an example, so that a potential buyer may see the URL and go directly to the Listing Domain without first having to go the "home.asp" site.

It will be understood that what has been referred to herein as a "web site" or "site" is also commonly referred to as a "web site page" or "page". It will also be understood that utilizing links to each web page after "home.asp" are carried out automatically in response to entries by the user on the previous page. Furthermore, while the embodiment disclosed herein illustrates use of the invention for advertising and selling real estate properties, it will be understood that other commodities may be advertised and sold using the method and system of the invention. In fact, virtually any type of product or service involving frequently changed data, particularly where users are the preferred or most convenient source of such changing data, can find advantageous application of the invention with appropriate modification for the different products or services.

Accordingly, although one embodiment of the invention has been disclosed by way of illustration, the scope of protection hereof shall be limited only by the appended claims and their equivalents.

I claim:

1. A method of advertising a property having a unique property address by automatically creating a unique web site having a domain name that incorporates the unique property address accomplished via an administrative web site, such unique web site having seller changeable parameters rendering it desirable for a seller to frequently modify the unique web site to keep the advertising current, the method comprising the steps of:

A. verifying a seller at an administrative web site;
   B. the administrative web site offering the verified seller a selection from a plurality of service functions, said service functions comprising at least:
      an automatic creation service function permitting the creation of a new unique web site;
         a. the administrative web site providing the verified seller who has selected said automatic creation service function a link to a web site creation page, said web site creation page comprising data entry options including at least a new web site layout and a unique web site domain name, whereby data related to said added property may be entered;
         b. the verified seller providing payment data to the administrative web site and the administrative web site verifying said payment data;
         c. the administrative web site providing the verified seller a link to a final page for finalizing said unique web site creation, said final page permitting the verified seller to update appropriate database entries, and permitting the verified seller to obtain access to a file folder corresponding to the new unique web site;
         d. the administrative web site sending a message to an appropriate agency requesting registration of said unique web site domain name thereby registering said unique web site domain name;
         e. the administrative web site automatically building the unique web site comprising the new web site layout; and
         f. the administrative web site automatically associating the unique web site with the unique web site domain name, wherein the unique web site becomes accessible via the Internet; and
      ii. an editing service function permitting the amendment of an existing unique web site;
         a. the administrative web site providing the verified seller who has selected said editing service function a link to a web site editing page, said web site editing page permitting the verified seller to modify at least one seller changeable parameter of the unique web site, whereby the advertisement is keep current; and
   C. providing a posted sign on the property, containing the property's unique web site domain name, wherein a potential buyer may view said property's unique web site and access advertisement information relating to the property on the Internet.

2. The method of claim 1, further comprising sending a message to said verified seller acknowledging said new web site creation, whereby said message is an e-mail.

3. The method of claim 1, whereby the message the administrative web site sends to the appropriate agency requesting registration of said unique web site domain name is an e-mail.

4. The method of claim 1, whereby said verified seller may frequently modify the unique web site by selecting said editing service function via the administrative web site or via a link provided at an URL located on the unique web site.

* * * * *